(12) United States Patent
Rane et al.

(10) Patent No.: US 8,630,444 B2
(45) Date of Patent: Jan. 14, 2014

(54) METHOD FOR EMBEDDING MESSAGES INTO STRUCTURE SHAPES

(75) Inventors: Shantanu Rane, Cambridge, MA (US);
Samarjit Das, Ames, IA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1028 days.

(21) Appl. No.: 12/650,289

(22) Filed: Dec. 30, 2009

(65) Prior Publication Data

US 2011/0158464 A1 Jun. 30, 2011

(51) Int. Cl.
*G06K 9/00* (2006.01)

(52) U.S. Cl.
USPC .......................................... 382/100

(58) Field of Classification Search
None
See application file for complete search history.

(56) References Cited

U.S. PATENT DOCUMENTS

| 6,256,398 | B1 * | 7/2001 | Chang ........................... 382/100 |
| 7,106,332 | B2 * | 9/2006 | Perry et al. ..................... 345/467 |
| 2001/0017932 | A1 * | 8/2001 | Chang ........................... 382/100 |
| 2004/0189618 | A1 * | 9/2004 | Perry et al. ..................... 345/179 |
| 2006/0061088 | A1 * | 3/2006 | Harrington et al. ............. 283/51 |

OTHER PUBLICATIONS

Huang et al., "Interword distance changes represented by sine waves for watermarking text images," IEEE Trans. On Circuits and Systems for Video Technology, vol. 11, No. 12, pp. 1237-124, Dec. 2001.*
Villan et al., "Text data-hiding for digital and printed documents: Theoretical and practical considerations," SPIE-IST Electronic Imaging, pp. 15-19, Jan. 2006.*

* cited by examiner

*Primary Examiner* — Nancy Bitar
(74) *Attorney, Agent, or Firm* — Dirk Brinkman; Gene Vinokur

(57) ABSTRACT

Embodiments of the invention disclose a system and a method for embedding a symbol in a glyph, comprising the steps of determining a set of landmarks representing an outline of the glyph; determining a data segment between two landmarks, wherein the data segment is suitable for embedding the symbol; modifying the data segment according to the symbol to produce a modified glyph such that the symbol is embedded in the modified glyph; and outputting the modified glyph.

15 Claims, 5 Drawing Sheets

200

400

METHOD FOR EMBEDDING MESSAGES INTO STRUCTURE SHAPES

RELATED PATENT APPLICATION

The following patents and patent applications are incorporated herein by reference: U.S. Pat. Nos. 6,396,492 entitled, "Detail-Directed Hierarchical Distance Fields," granted May 28, 2002, by Frisken et al.; 7,002,570 entitled, "Tiled Generation of Adaptively Sampled Distance Fields," granted Feb. 21, 2006, by Frisken et al.; 7,034,845 entitled, "Method for Antialiasing an Object Represented as a Two-Dimensional Distance Field in Image-Order," granted Apr. 25, 2006, by Frisken et al.; and 7,123,271 entitled, "Method and Apparatus for Antialiasing a Set of Objects Represented as a Set of Two-Dimensional Distance Fields in Image-Order," granted Oct. 17, 2006, by Frisken et al.; and U.S. patent application Ser. Nos. 12/329,869 entitled, "Method for Embedding a Message into a Document," filed Dec. 8, 2008, by Rane et al.; and 12/347,277, entitled, "Method for Embedding Messages into Documents Using Distance Fields,' filed Dec. 31, 2008, by Rane et al.

FIELD OF THE INVENTION

This invention relates generally to embedding messages inside structured shapes, and more particularly to embedding and detecting messages in glyphs.

BACKGROUND OF THE INVENTION

Watermarks

Messages are often embedded in documents as watermarks. The embedded messages can be used for security, privacy, and copyright protection.

Watermarking for paper "hard-copy" documents differs from electronic "soft-copy" documents. For soft-copy documents, all operations that involve the watermark, such as watermark insertion, document copying, document degradation, document compression, and watermark extraction are performed in the digital domain. For hard-copy documents, watermark insertion may occur digitally, but operations such as printing, faxing, photocopying involve the hardcopy document itself. Moreover, watermark extraction is performed on a scanned version of the hardcopy document. Thus, watermarks in hard-copy documents can be degraded when the documents are copied, scanned, faxed or otherwise manipulated.

Glyphs

A glyph, as defined herein, is a fundamental graphic object. The most common examples of glyphs are text characters or graphemes. Glyphs may also be ligatures, that is, compound characters, or diacritics. A glyph can also be a pictogram or ideogram. The term glyph can also be used for a non-character, or a multi-character pattern. As used herein, a glyph is some arbitrary graphic shape or object that is multi-dimensional.

Message Embedding

Method for embedding messages in signals such as images, video, and audio are known. However, embedding messages unobtrusively inside graphical objects like glyphs is difficult. Even small changes to the glyph, e.g., spacing and orientation, can easily be detected by the human visual system. Accordingly, changes to the glyphs, for the purpose of hiding messages must be extremely small and detectable at the same time. These conflicting requirements make the problem challenging.

This problem is even more difficult in the case of hard-copy watermarking. A hard-copy document can undergo physical deterioration over time. A message that would have been detectable in an electronic version of the document can be lost when the printed document is photocopied or scanned, e.g., subtle changes in gray level are lost after copying.

Conventional Message Embedding Methods

Some conventional message embedding methods treat a text document as an image and use image-based watermarking techniques. However, those methods do not work well with printers, which primarily operate on bitmapped representations of individual characters or half-tone representations of colors and shades.

Another conventional method slightly alters the color of characters such that the difference is imperceptible to the eye, but can be sensed by a scanner. Because the embedded message is invisible, it is difficult to alter the watermark. However, this method is not robust to photocopying because small differences in color or gray-level are easily lost when the document is copied.

Another method modulates a distance between individual letters, words or successive lines of text. At low embedding rates, that method is nearly invisible to a reader, and survives copying. However, at high embedding rates, the non-uniform distances between the characters, words or lines are easily visible to an attacker and also annoying to a casual reader.

Another method uses dithering to make the entire character narrower or wider than normal. However, documents produced by the method cannot easily be photocopied without destroying the message.

Another method embeds a pseudo random pattern of dots in the background of the document irrespective of the location of the text. The dots, although relatively unobtrusive, can still be easily detected by a computer and removed. Further, the dots are small and may not survive more than one instance of photocopying.

Distance Fields

The shape of a graphical object, e.g., a glyph, can be represented in a memory of a computer system as a collection of sample points in an N-dimensional space. Associated with each sample point is a smallest distance from the sample to a nearest boundary of the shape. The distances are positive or negative to indicate whether the sample is inside or outside the object, and zero when the sample is on the boundary. The collection of samples with the associated distance values is called a sampled distance field. Distance fields can also be represented as analytic procedures stored in the memory of the computer system.

As defined herein, a distance field refers to all types of distance fields, both sampled and non-sampled.

The distance field can be used to represent attributes other than the shape of glyph, such as color, gray-level, density and texture. More precisely, there is a mapping from the distance values of the distance field representing the glyph to values representing other attributes of the glyph.

Adaptively Sampled Distance Fields (ADFs)

In an adaptively sample distance field (ADF), the density of the samples depends on a level of detail required to represent different parts of the shape. For example, complicated local variations may require a large number of samples. Thus, the ADF is a representation that enables processing of arbitrary shapes, e.g., glyphs such as text characters, cartoons, and logos.

SUMMARY OF THE INVENTION

It is an object of the invention to provide a method for embedding a message inside soft-copy and hard-copy documents as a watermark.

It is a further object of the invention to provide such a method that the message is unobtrusive to a reader of the document.

It is a further object of the invention to provide such a method that is suitable for embedding a relatively large message.

It is a further object of the invention to provide such a method that the embedded message is robust to physical deteriorations of the document.

It is a further object of the invention to provide such a method that the embedded message is robust to physical copying of the document.

It is a further object of the invention to provide such a method that the embedded message can be extracted from an electronic version of the document.

The invention is based on a realization that when an outline of a glyph is represented by a set of curves, e.g., Bezier curves, a slight modification (perturbation) of the curves can result in multiple similar-looking shapes corresponding to a message. Thus, by modifying the curves of the glyph, e.g., by modifying distance values in a distance field representing the curves, the shape of the glyph can be modified in an unobtrusive way while embedding a message in a document.

Embodiments of the invention disclose a system and a method for embedding a symbol in a glyph, comprising the steps of determining a set of landmarks representing an outline of the glyph; determining a data segment between two landmarks, wherein the data segment is suitable for embedding the symbol; modifying the data segment according to the symbol to produce a modified glyph such that the symbol is embedded in the modified glyph; and outputting the modified glyph.

DETAILED DESCRIPTION OF THE PREFERRED EMBODIMENTS

The example glyphs and documents described herein are represented by adaptively sampled distance fields (ADFs) which is a specific kind of data structure. However, all embodiments described herein are independent of the underlying data structures. For example, the embodiments also work with other types of distance fields, e.g., a regularly sampled distance field, or a procedural distance field.

The embodiments of the invention provide a method for embedding symbols of a message in a glyph. As described above, the glyph is multi-dimensional, e.g., a text character, an arbitrary object or a manifold, e.g., a differentiable manifold. For simplicity, the embodiments of the inventions are described using two-dimensional glyphs. However, our invention is applicable to the glyphs of higher dimensionality.

For example, in some embodiments of the invention, an outline is extracted from the glyph, the outline is represented using Bezier curves, the Bezier curves are slightly modified (perturbed) to provide a change of shape. This results in a modification of the shape of the glyph, which is generally undetectable to a human visual system under normal viewing conditions. Thus, the slight change in shape is difficult to locate and alter, while at the same time this change is resilient to operations such as photocopying of the document. An ADF or regularly sampled distance field or other suitable representation is used only to store and represent the modified shape.

Message Embedding

Figure 1:
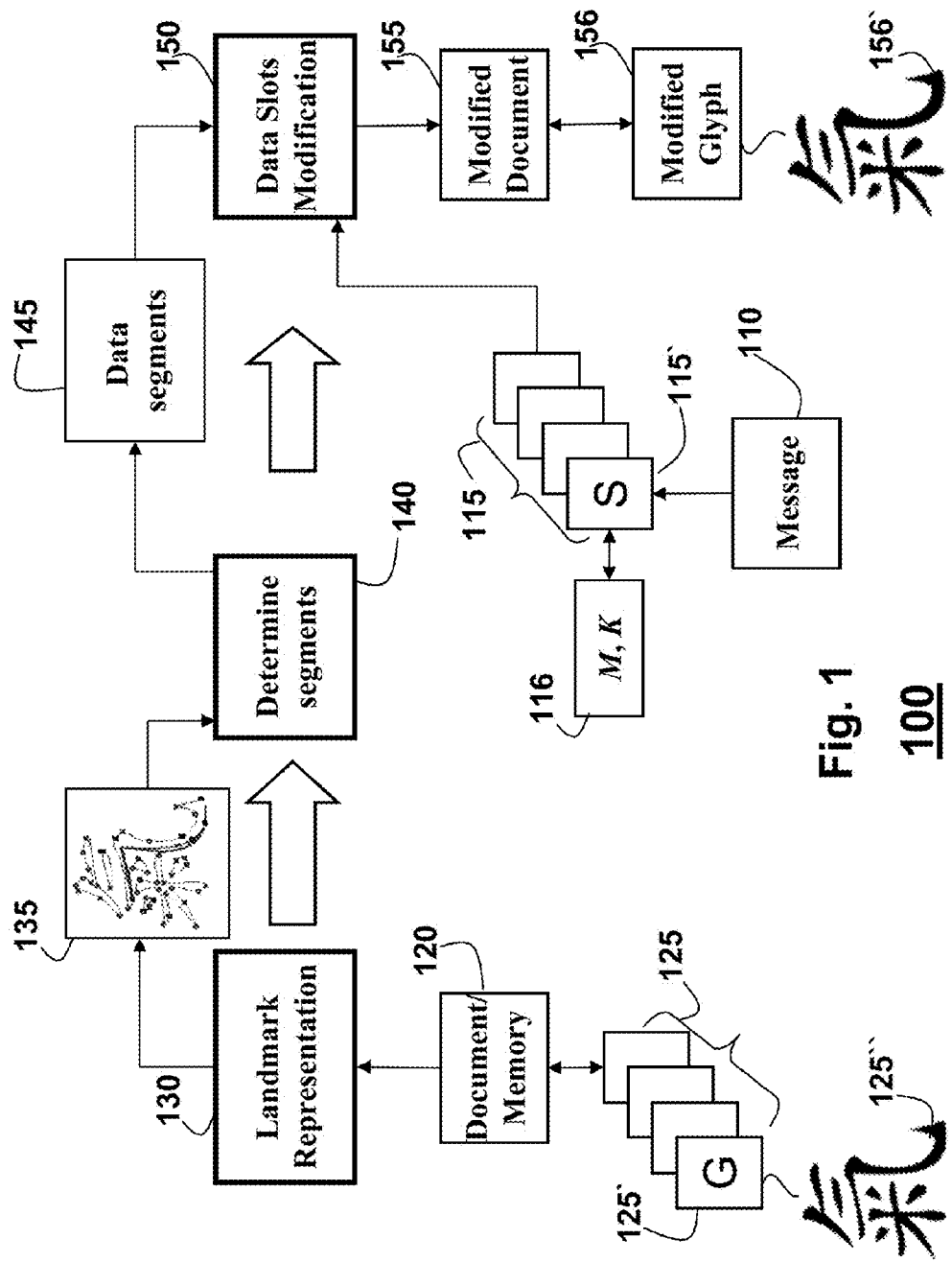
FIG. 1 is a block diagram of a method for embedding a message in a document including a set of glyphs according to an embodiment of the invention.

FIG. 1 shows a method 100 for embedding symbols (S) 115 of a message 110 in a set of glyphs 125, for example a glyph 125'. A glyph 125" is a visual example of the glyph 125'. The glyphs can be rendered on, e.g., a document 120 or stored in a computer memory.

Each symbol is selected from a finite alphabet $\{0, 1, \ldots, K-1\}$. Parameters M and K 116 are predetermined. In some embodiments, the message 110 includes more than M symbols. In those embodiments, the message is embedded into more than one glyph 125. In another embodiment, the message is embedded in M glyphs, i.e., one symbol is embedded in each glyph. The symbols of the message include information bits and, optionally, error correction symbols.

The glyph 125' is structured. Structured glyphs, as defined herein, have shapes that can be stored inside data structures, such as structures based on splines, wavelets, or distance fields. The embodiments of our invention are independent of a selected data structure. For example, one embodiment uses the data structure of the ADF. The ADF allows a shape to be stored efficiently in a tree-based representation and enables rendering of the shape at various resolutions and dimensions.

The message 110 is embedded in an outline of the shape of the glyph. The outline can be represented by a curve, e.g., a line, or a surface defining a boundary of the glyph. The outline is an inherent characteristic of the shape, which allows retaining embedded information under degrading procedures, such as copying or scanning. The curve representing the outline can be, for example, a Bezier curve, a spline curve. The embodiments represent 130 the outline the shape of the glyph as a set of landmarks 135. The set of landmarks includes primary and secondary landmarks that provide a coarse representation of the shape, as described in greater detail below in FIG. 2.

Based on the landmarks, a set of data segments 145 of the outline is determined 140, wherein each data segment is suitable to be modified in order to embed the symbol. As defined herein, and explained in more details below, a data segment is a part of the outline of the shape of the glyph, and is a differentiable manifold, e.g., a differentiable curve, which has no internal primary landmarks. The data segments are modified 150 gradually, e.g., along the curve, to embed the symbols 115, producing a modified glyph 156. A glyph 156' is a visual example of the glyph 156.

The modified glyph is outputted, for a storage using, e.g., the ADF, or for being incorporated into a modified document 155. The modified document 155, including the modified glyph 156, can be rendered before the symbols 115 are extracted from the document 155. Example of rendering includes copying, printing, faxing, emailing, displaying, scanning of the modified document 155, or combinations thereof.

Landmarks

Figure 2:
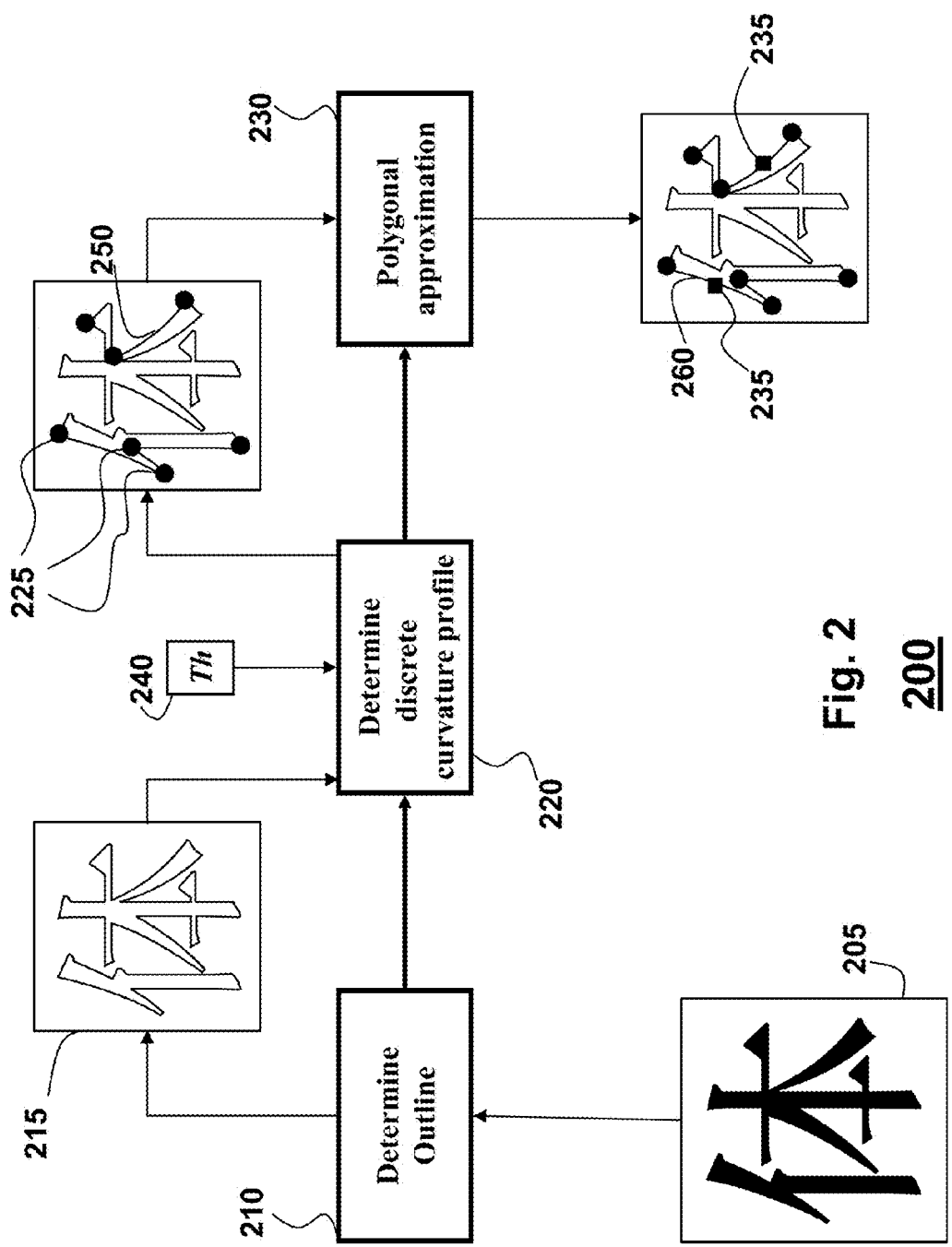
FIG. 2 is schematic of representing an outline of a shape of a glyph with a set of landmarks according to embodiments of the invention.

FIG. 2 shows how the outline of the shape of the glyph is represented with the set of landmarks. If the glyph, e.g., a glyph 205, is already stored as the ADF, then the outline 215 is available directly. If the glyph is provided as an image, then the outline is determined 210 using, e.g., an edge extraction. Then, a discrete curvature profile of the outline is determined 220, and a curvature threshold 240 is used to locate parts of the profile with high curvature. The points of high curvature are primary landmarks 225, and serve as primary visual cues for the shape of the glyph. Then, polygonal approximation 230 on the outline between two primary landmarks determines a set of secondary landmarks 235. The set of primary and secondary landmark gives the coarse representation of the shape of the glyph.

In one embodiment, a polygonal approximation is used to obtain secondary landmarks based on the primary landmarks. In another embodiment, a pre-decided number of secondary landmarks are obtained by traversing the length of the curve between two primary landmarks and marking off secondary landmark points at equal distances. In yet another embodiment, a variable number of secondary landmarks are obtained by traversing the length of the curve between two primary landmarks and marking off secondary landmarks at unequal distances based on the local curvature at any given position, and, therefore, providing more secondary landmarks when the curvature is high and fewer secondary landmarks when the curvature is low.

Data Segments

The data segments 145 are selected by traversing the outline and determining segments between two landmarks suitable for embedding the symbol. A segment is selected as a data segment if the segment is a differentiable manifold and has no internal primary landmarks. For example, the segments 250 and 260 are both suitable to be selected as the data segments. In one embodiment, the length of the segments is constrained to be within a specified range $[l_{min}, l_{max}]$. In one embodiment, M data segments are randomly selected from the data segments for embedding.

Data Segment Modification

The data segment is modified in any one of K different ways. For imperceptibility, the modifications are smooth and gradual along the segment. Additionally, the modification is performed such that no $C_0$ or $C_1$ discontinuities are introduced, wherein the $C_0$ discontinuity is a break in the outline of the shape and the $C_1$ discontinuity is a discontinuity in the tangent, i.e., a sharp kink. The overall height and width of the shape of the glyph should not change after the modification. In one embodiment, the shape modification is performed in such a way that the total number of landmarks in the modified shape of the glyph is the same as in the unmodified glyph. In alternative embodiment, only the number of primary landmarks is preserved.

Figure 3:
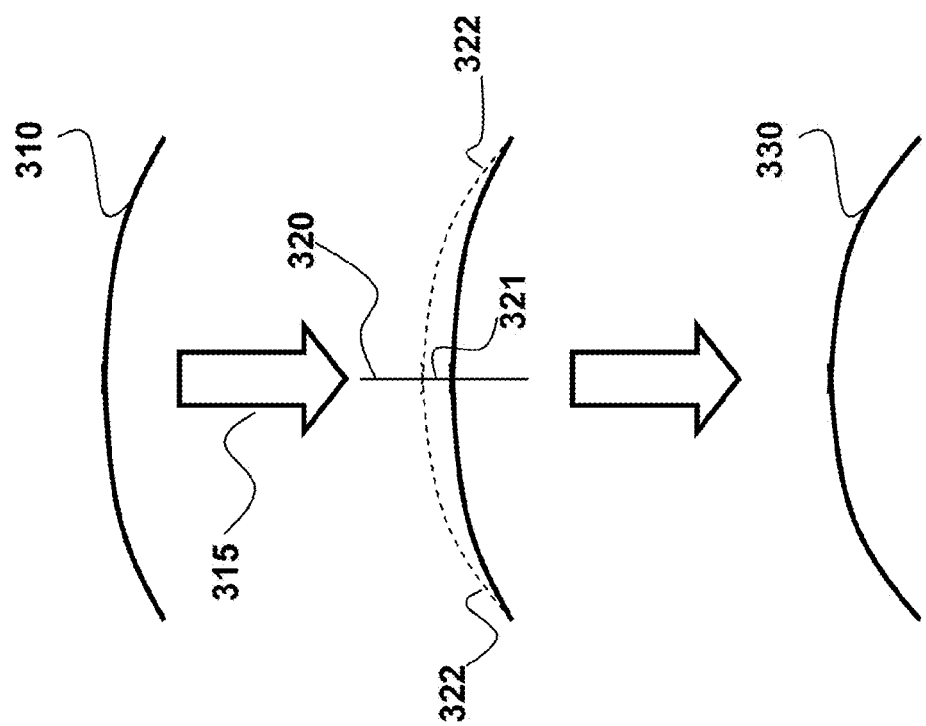
FIG. 3 is a schematic of embedding a symbol in a data segment according to an embodiment of the invention.

FIG. 3 shows an example of embedding the symbol, e.g., a bit, in the data segment. The curved data segment 310 is modified along a line 320 normal to the data segment, with maximum modification 321 halfway along the data segment. To prevent the introduction of discontinuities, the modification is minimal near the edges 322 of the data segment.

In one embodiment, the landmarks at the edge of the data segment used as anchors of the data segment, and internal landmarks or randomly selected points in the segment are used as control points, wherein the location of the control points are slightly changed to modify the data segment.

In another embodiment, the deformation along the curve of the data segment follows a Gaussian profile with a mode σ located halfway through the data segment and edges located at ±3σ. In this embodiment, the modified data segment 330 represents a 1-bit, while unmodified data segment 310 represents a 0-bit.

A large number of modifications can be used by the embodiments depending on the level of desired imperceptibility. If there are M data segments in the outline, then each unique combination of M symbols is associated with a unique modified outline. Thus, the outline can be represented with $K^M$ modified versions.

In one embodiment, the modified glyph 156 is stored using the ADF. The outline of modified glyph is represented as a connected set of cubic Bezier curves. Each curve is represented by the locations of the landmarks. The coordinates of all landmarks on the Bezier curves comprise outline path information of the modified glyph. This outline path information is stored as the ADF. The outline path information is given with respect to normalized spatial coordinates [Xmin, Xmax,Ymin,Ymax]=[0,1,0,1] and the ADF module maps the normalized coordinates to image coordinates whenever the glyph is rendered.

Extracting the Symbols

Figure 4:
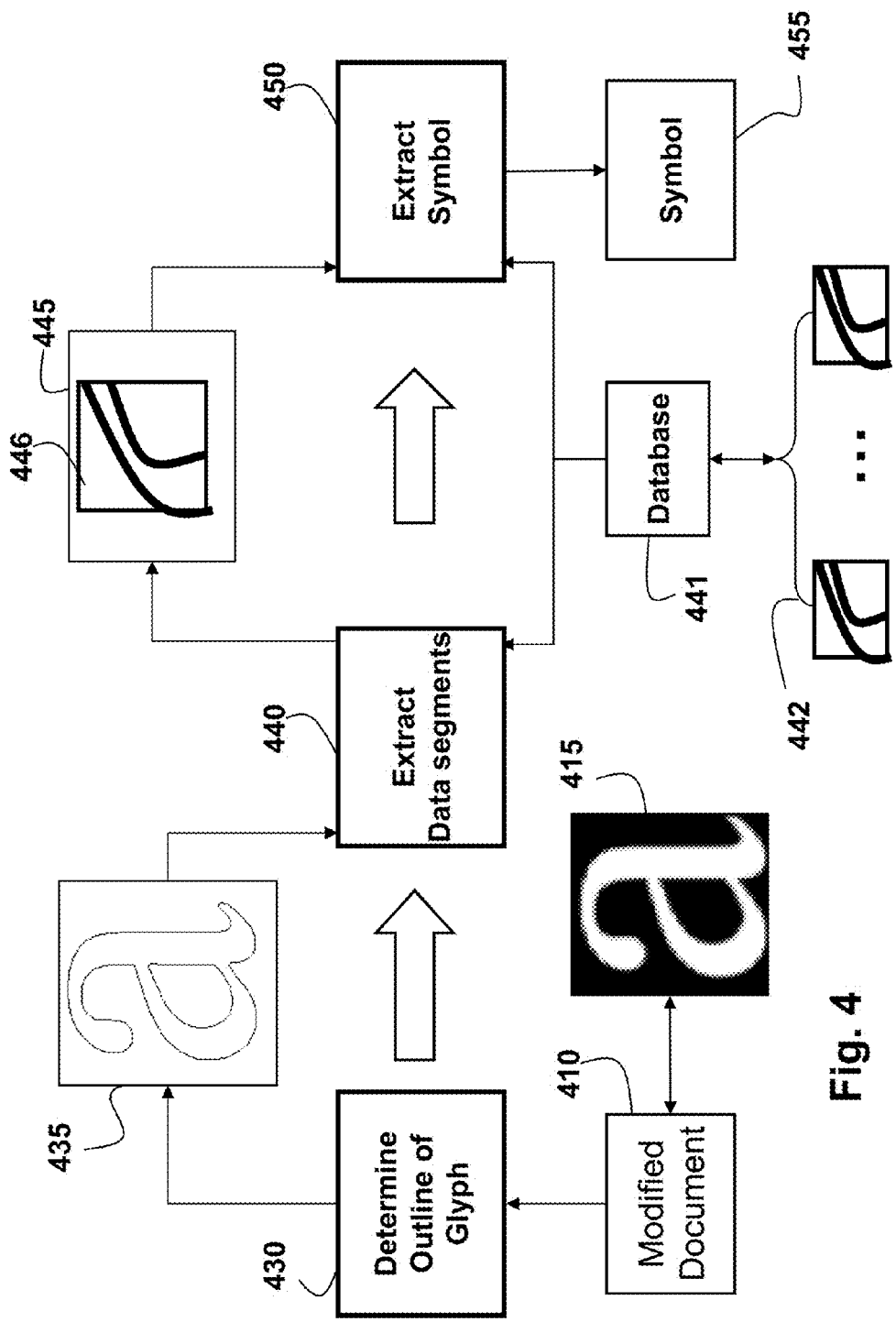
FIG. 4 is a block diagram of a method for extracting symbols embedded in a modified glyph.

FIG. 4 shows a method 400 for extracting the symbols embedded in a modified glyph, for example, a text character 415 extracted from an electronic document 410, or a printed-photocopied-scanned page. The method 400 has access to a database 441 of unmodified data segments as well as modified versions of the data segments 442, and the embedded symbol associated with each modified data segment. The database 441 also contains the original, i.e., unmodified version of the modified glyph 435.

An outline 435 of the glyph 415 is determined 430. The method 400 knows the identity of the glyph 415. For example, in one embodiment, the method 400 recognizes the glyph using an optical character recognition (OCR) available in most scanners. Since the modifications of the glyph are very small, the OCR works equally well for modified and unmodified glyphs. In another embodiment, the recognized glyph is registered, i.e., scaled in size if necessary, and aligned, with the unmodified glyph present in database 441, mapped onto a pixel grid corresponding to a normalized coordinate frame, and the determining of the outline is performed on the registered glyph.

The outline includes data segments, which potentially are modified with embedded symbols, e.g., a data segment 445 is extracted 440. Because the glyph is registered with the database 441, it is known which portions of the outline are the data segments. Using the database, a mask 446 is formed around an approximate location of each candidate data segment and the outline outside the mask is discarded.

For example, a contour-tracing method, based on 8-connected pixels, is used to extract the outline segment within an area of the mask. The tracing is initiated at a pixel closest to the candidate data segment. In one embodiment, after an outline segment is determined, a length of the outline segment is compared with a length of the corresponding outline segment of the unmodified data segment. If the length of the outline segment is outside the predetermined range $[l_{min}, l_{max}]$, the method ignores the outline segment and attempts to detect another outline segments within the area of the mask. If a valid outline segment is detected, then the method extracts 450 the embedded symbol 455, e.g., by comparing the outline data segment 445 with the modified versions of the data segments 442 in the database 441, and selects the symbol 455 associated with matched modified data segment.

Details of determining the closest modified data segment 442 are described below with reference to FIG. 5.

Procrustes Analysis

Figure 5:
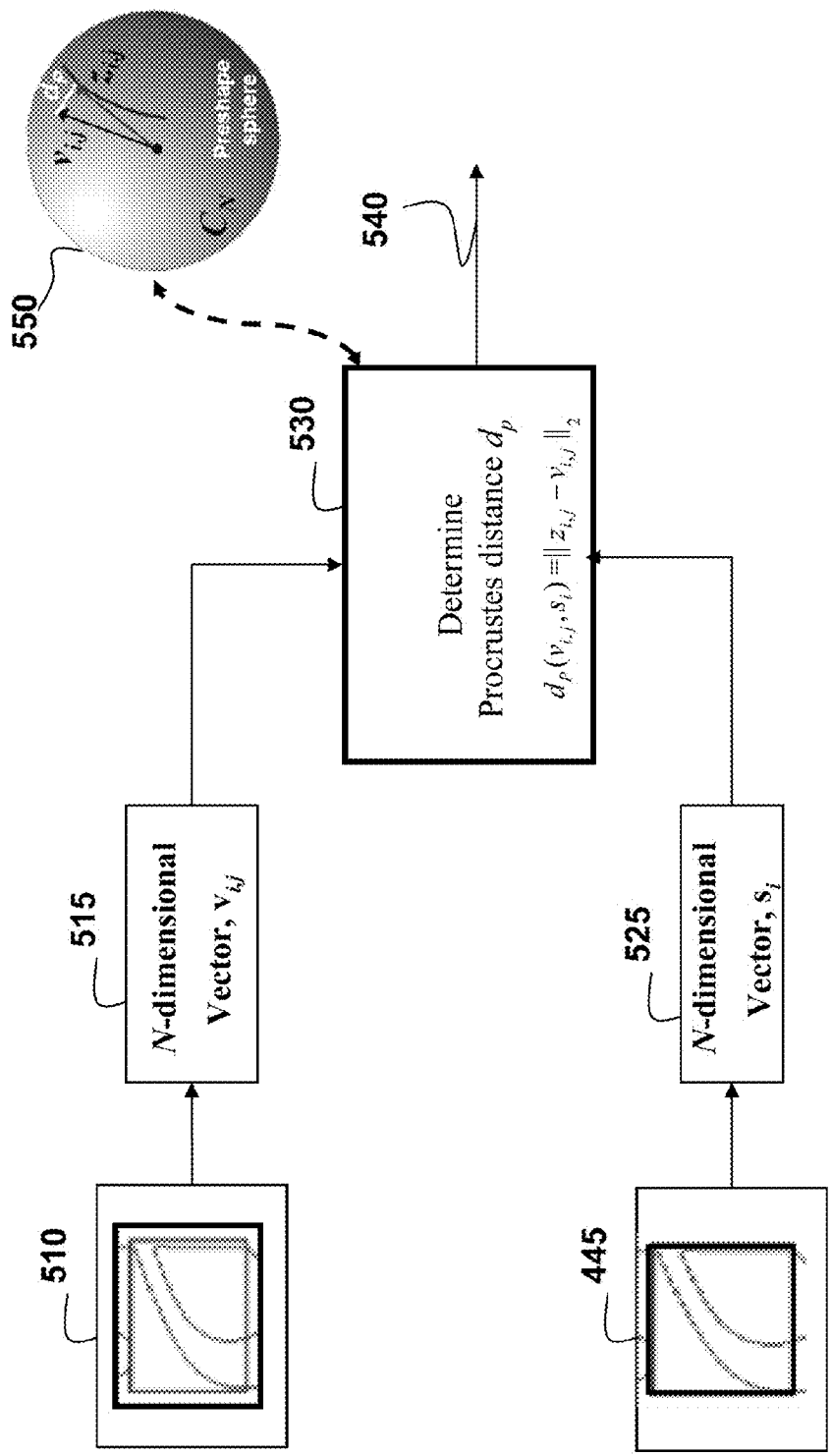
FIG. 5 is a block diagram of a method for comparing data segments using Procrustes analysis according to an embodiment of the invention.

FIG. 5 shows a method for comparing the extracted data segment 445 with the modified data segments 442 from the database 441, e.g., a modified data segment 510, using Procrustes analysis 530 to determine Procrustes distances 540 between the data segments according to one embodiment of the invention. The method for obtaining Procrustes distance is as follows.

The extracted data segment is uniformly sampled at N discrete points along length of the segment producing a N-dimensional vector $s_i$ 525. The vector $s_i$ is mapped to a unit hypersphere 550, i.e., a preshape sphere, via translation and scale normalization according to $$y_i = C_N s_i \text{ and } w_i = \frac{y_i}{\|y_i\|}$$

where $C_N = I_N - 1_N 1_N^T/N$, $I_N$ is an N×N identity matrix and $1_N$ is a column vector of ones, $w_i$ is a preshape of the $i^{th}$ data segment, and is on a unit hypersphere. Similarly, the method obtains N-dimensional preshape vectors $v_{i,j}$, j=0, 1, 2, ..., K−1 of the modified data segments on the unit hypersphere.

The extracted preshape vector $w_i$ corresponding to data segment i is rotation-normalized with respect to each of the modified data segments $v_{i,j}$ to produce a vector $z_{i,j} = w_i e^{j\theta_{i,j}}$ where $\theta_{i,j} = \text{angle}(w_i * v_{i,j})$. After rotation normalization in the preshape space, the Procrustes distance is determine according to $$d_P(v_{i,j}, s_i) = \|z_{i,j} - v_{i,j}\|_2.$$

Determination of Embedded Message

The message symbol $b_i \in \kappa\{0, 1, \ldots, K-1\}$ in the $i^{th}$ data segment is determined according to $$b_i = \text{argmin}_{\forall j \in \kappa} d_P(v_{i,j}, s_i).$$

According to the aforementioned relation, the method selects the symbol associated with that modified data segment in the database which is closest in Procrustes distance to the extracted data segment. In some embodiments, the sequence $\{b_m\}, m=\{1, 2, \ldots, M\}$ is the message embedded in the glyph, where M is the total number of symbols embedded in the data segments of the glyph. In one embodiment, only one bit is embedded inside each shape. In this case, the same bit (0 or 1) is embedded in all M data segments. This bit is recovered by majority voting over the M data segments, thereby giving the functionality of error correcting codes.

The embodiments of the invention are used in number of applications that require message extraction, including but not limited to extraction from a degraded, torn, crinkled hard copy document; extraction from a scanned version of a hard-copy document; extraction from a document that has been photocopied multiple times; extraction from an electronic image document such as a bit map image file (BMP), JPEG file, tagged image file format (TIFF) file, raw image data file or any other image format; extraction from an electronic document such as Microsoft Word, Powerpoint, iWork Keynote, iWork Pages, PDF or post script (PS) files; and extraction in the presence of distortions caused while photographing a shape using a camera or a camera phone.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for embedding a symbol in a glyph, comprising a processor for performing steps of the method, comprising the steps of:
   determining a set of landmarks representing an outline of the glyph;
   determining a data segment between two landmarks, wherein the data segment is suitable for embedding the symbol, wherein the set of landmarks includes a primary landmark, and wherein the data segment is a differentiable manifold, and wherein the data segment does not include the primary landmark internally;
   modifying the data segment according to the symbol to produce a modified glyph such that the symbol is embedded in the modified glyph;
   outputting the modified glyph, wherein the steps are performed in a computer system; and
   extracting the symbol from the modified glyph based on a Procrustes analysis.

2. The method of claim 1, wherein the modifying further comprises:
   selecting the two landmarks as anchors; and
   modifying the data segment gradually along a length of the data segment.

3. The method of claim 1, wherein the data segment is a Bezier curve, the modifying further comprising:
   modifying the data segment gradually along the Bezier curve according to the symbol.

4. The method of claim 1, wherein the outputting further comprises:
   rendering the modified glyph in a modified document, wherein the symbol is embedded in the modified glyph.

5. The method of claim 1, further comprising:
   selecting the two landmarks at the ends of the data segment.

6. The method of claim 1, further comprising:
   representing the glyph by adaptively sampled distance fields (ADFs).

7. The method of claim 1, wherein the glyph is structured.

8. The method of claim 1, further comprising:
   selecting the glyph from a finite alphabet.

9. The method of claim 1, wherein the symbol to be embedded in the glyph is a part of a message including no more than M symbols;
   selecting the glyph from a finite alphabet of K symbols, wherein parameters M and K are predetermined; and
   embedding the symbols in a plurality of glyphs.

10. The method of claim 1, further comprising:
    determining an outline of the glyph as a discrete curvature profile;
    determining points of high curvature of the outline based on a threshold; and
    selecting the points of the high curvature as primary landmarks.

11. The method of claim 10, further comprising:
    determining secondary landmarks using a polygonal approximation on the outline between any two primary landmarks.

12. The method of claim 10, further comprising:
    traversing the outline of the glyph between two primary landmarks to determine secondary landmarks.

13. The method of claim 1, further comprising:
    selecting the data segment having a length within a predetermined range.

14. The method of claim 1, further comprising:
    modifying the data segment such that no discontinuity or break in an outline of the glyph and no discontinuity in an tangent of the glyph are introduced.

15. The method of claim 1, further comprising:
modifying the data segment based on a Gaussian profile with a mode located about halfway through the data segment.

* * * * *